(12) United States Patent
Uusitalo (10) Patent No.: US 8,700,303 B2
(45) Date of Patent: Apr. 15, 2014

(54) NAVIGATION METHOD, APPARATUS, COMPUTER PROGRAM AND USER INTERFACE

(75) Inventor: Jussi Severi Uusitalo, Hämeenlinna (FI)

(73) Assignee: Nokia Corporation, Espoo (FI)

( * ) Notice: Subject to any disclaimer, the term of this patent is extended or adjusted under 35 U.S.C. 154(b) by 175 days.

(21) Appl. No.: 13/130,483

(22) PCT Filed: Nov. 20, 2008

(86) PCT No.: PCT/EP2008/065945
§ 371 (c)(1),
(2), (4) Date: Aug. 9, 2011

(87) PCT Pub. No.: WO2010/057531
PCT Pub. Date: May 27, 2010

(65) Prior Publication Data
US 2011/0307174 A1    Dec. 15, 2011

(51) Int. Cl.
*G05D 1/02*    (2006.01)
(52) U.S. Cl.
USPC ........... 701/300; 701/432; 701/438; 701/445; 701/447; 701/450
(58) Field of Classification Search
USPC .................. 701/300, 432–438, 445–447, 450
See application file for complete search history.

(56) References Cited

U.S. PATENT DOCUMENTS

| | | | | |
|---|---|---|---|---|
| 5,587,911 A | * | 12/1996 | Asano et al. | 701/428 |
| 5,944,768 A | * | 8/1999 | Ito et al. | 701/418 |
| 5,948,040 A | * | 9/1999 | DeLorme et al. | 701/426 |
| 6,314,370 B1 | * | 11/2001 | Curtright | 701/412 |
| 2004/0243306 A1 | | 12/2004 | Han | |
| 2004/0260465 A1 | | 12/2004 | Tu | |
| 2005/0261822 A1 | | 11/2005 | Wako | |
| 2006/0235606 A1 | | 10/2006 | Finn et al. | |

FOREIGN PATENT DOCUMENTS

| | | |
|---|---|---|
| EP | 1 174 685 A1 | 1/2002 |
| EP | 1 365 213 A1 | 11/2003 |
| EP | 1 703 257 A1 | 9/2006 |

OTHER PUBLICATIONS

International Search Report for Application No. PCT/EP2008/065945 dated Jul. 29, 209.
International Search Report for Application No. PCT/EP2008/065945 dated Jul. 29, 2009.

\* cited by examiner

*Primary Examiner* — James Trammell
*Assistant Examiner* — Majdi Alsomiri
(74) *Attorney, Agent, or Firm* — Alston & Bird LLP (57) ABSTRACT

An apparatus, method, computer program and user interface wherein the method comprises: a controller configured to determine locations of interest within a predetermined distance of a first location; a display configured to simultaneously present a map, a first bounded area of the map and a list of the determined locations of interest within the first bounded area; a user input device configured to enable a user to make a user input, wherein; the controller is configured to detect a user input and, in response to the detection of the user input, control the display to present a second bounded area of the map and update the list of the determined locations of interest so that locations of interest within the second bounded area are presented in the list.

20 Claims, 7 Drawing Sheets

NAVIGATION METHOD, APPARATUS, COMPUTER PROGRAM AND USER INTERFACE

FIELD OF THE INVENTION

Embodiments of the present invention relate to a method, apparatus, computer program and user interface for enabling user input. In particular, they relate to method, apparatus, computer program and user interface for enabling user input to enable access to information relating to locations of interest.

BACKGROUND TO THE INVENTION

It is often useful for a user to obtain information about locations of interest. For example, if they are in a new or unfamiliar location they may wish to obtain information about local businesses and services which may be of use to them. It may be useful for them to be able to obtain information about a plurality of such businesses and services in order to enable them to select the business or service which best suits their needs.

BRIEF DESCRIPTION OF VARIOUS EMBODIMENTS OF THE INVENTION

According to various, but not necessarily all, embodiments of the invention there is provided an apparatus comprising: a controller configured to determine locations of interest within a predetermined distance of a first location; a display configured to simultaneously present a map, a first bounded area of the map and a list of the determined locations of interest within the first bounded area; a user input device configured to enable a user to make a user input, wherein; the controller is configured to detect a user input and, in response to the detection of the user input, control the display to present a second bounded area of the map and update the list of the determined locations of interest so that locations of interest within the second bounded area are presented in the list.

In some embodiments of the invention the bounded area may have a defined perimeter. At least a portion of the perimeter may be presented on the display.

In some embodiments of the invention the determined locations of interest which are presented in the list may be the locations of interest which satisfy a first criterion with respect to the bounded area. The first criterion may be that the locations of interest are within the bounded area and are within a determined distance of the perimeter of the bounded area.

In some embodiments of the invention the first location may be the location of the user. In some embodiments of the invention the first location may be a location selected by the user.

In some embodiments of the invention the locations of interest may be presented on the map.

In some embodiments of the invention the user input may be a trace user input in the region of the display in which the map is presented. Also in some embodiments of the invention the user input may be a trace user input in the region of the display in which the list of the determined locations of interest is presented.

In some embodiments of the invention the scale of the map may be changed in response to the user input.

According to various, but not necessarily all, embodiments of the invention there is provided a method comprising: determining locations of interest within a predetermined distance of a first location; controlling a display to simultaneously present a map, a first bounded area of the map and a list of the determined locations of interest within the first bounded area; detecting a user input; and in response to the detection of the user input, controlling the display to present a second bounded area of the map and updating the list of the determined locations of interest so that locations of interest within the second bounded area are presented in the list.

According to various, but not necessarily all, embodiments of the invention there is provided a computer program comprising program instructions configured to control an apparatus, the apparatus comprising a controller configured to determine locations of interest within a predetermined distance of a first location, a display and a user input device, the program instructions providing, when loaded into a processor; means for controlling a display to simultaneously present a map, a first bounded area of the map and a list of the determined locations of interest within the first bounded area; means for detecting a user input, and means for, controlling the display, in response to the detected user input, to present a second bounded area of the map and updating the list of the determined locations of interest so that locations of interest within the second bounded area are presented in the list.

According to various, but not necessarily all, embodiments of the invention there is provided a user interface comprising: a display configured to simultaneously present a map, a first bounded area of the map and a list of determined locations of interest within the first bounded area, wherein the determined locations of interest are within a predetermined distance of a first location; a user input device configured to enable a user to make a user input; wherein in response to the user input the display is configured to present a second bounded area of the map and update the list of the determined locations of interest so that locations of interest within the second bounded area are presented in the list.

The apparatus may be for wireless communication or satellite navigation.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

The Figures illustrate an apparatus 1 comprising: a controller 7 configured to determine locations of interest 69 within a predetermined distance of a first location 67; a display 15 configured to simultaneously present a map 55, a first bounded area 57 of the map 55 and a list 71 of the determined locations of interest 69 within the first bounded area 57; a user input device 17 configured to enable a user to make a user input, wherein; the controller 7 is configured to detect a user input and, in response to the detection of the user input, control the display 15 to present a second bounded area 91A, 91B of the map 55 and update the list 71 of the determined locations of interest 69 so that locations of interest 69 within the second bounded area 91A, 91B are presented in the list 71.

Figure 1:
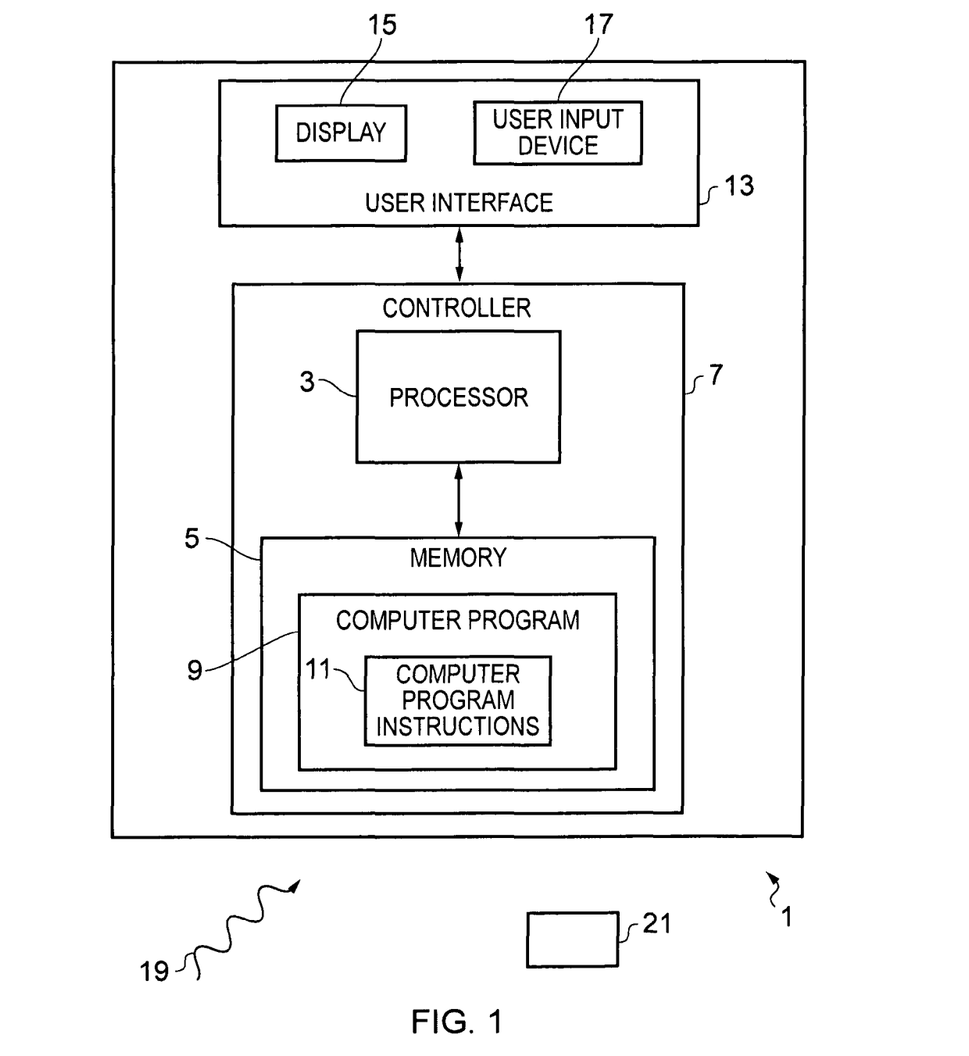
FIG. 1 schematically illustrates an electronic apparatus.

FIG. 1 schematically illustrates an apparatus 1. The apparatus 1 may be an electronic apparatus. Only features referred to in the following description are illustrated. It should, however, be understood that the apparatus 1 may comprise additional features that are not illustrated. The apparatus 1 may be, for example, a mobile cellular telephone, a satellite navigation apparatus, a personal computer, a camera, a personal digital assistant or any other apparatus that enables a user to determine locations of interest and provides information about the determined locations of interest to the user. The apparatus 1 may be a handheld apparatus 1 which can be carried in a user's hand, handbag or jacket pocket for example.

The illustrated apparatus 1 comprises: a user interface 13 and a controller 7. In the illustrated embodiment the controller 7 comprises a processor 3 and a memory 5.

The controller 7 may be implemented using instructions that enable hardware functionality, for example, by using executable computer program instructions 11 in a general-purpose or special-purpose processor 3 that may be stored on a computer readable storage medium 21 (e.g. disk, memory etc) to be executed by such a processor 3.

The processor 3 is configured to receive input commands from the user interface 13 and also to provide output commands to the user interface 13. The processor 3 is also configured to write to and read from the memory 5.

In the embodiment illustrated in FIG. 1 the user interface 13 comprises a display 15 and a user input device 17.

Figure 3:
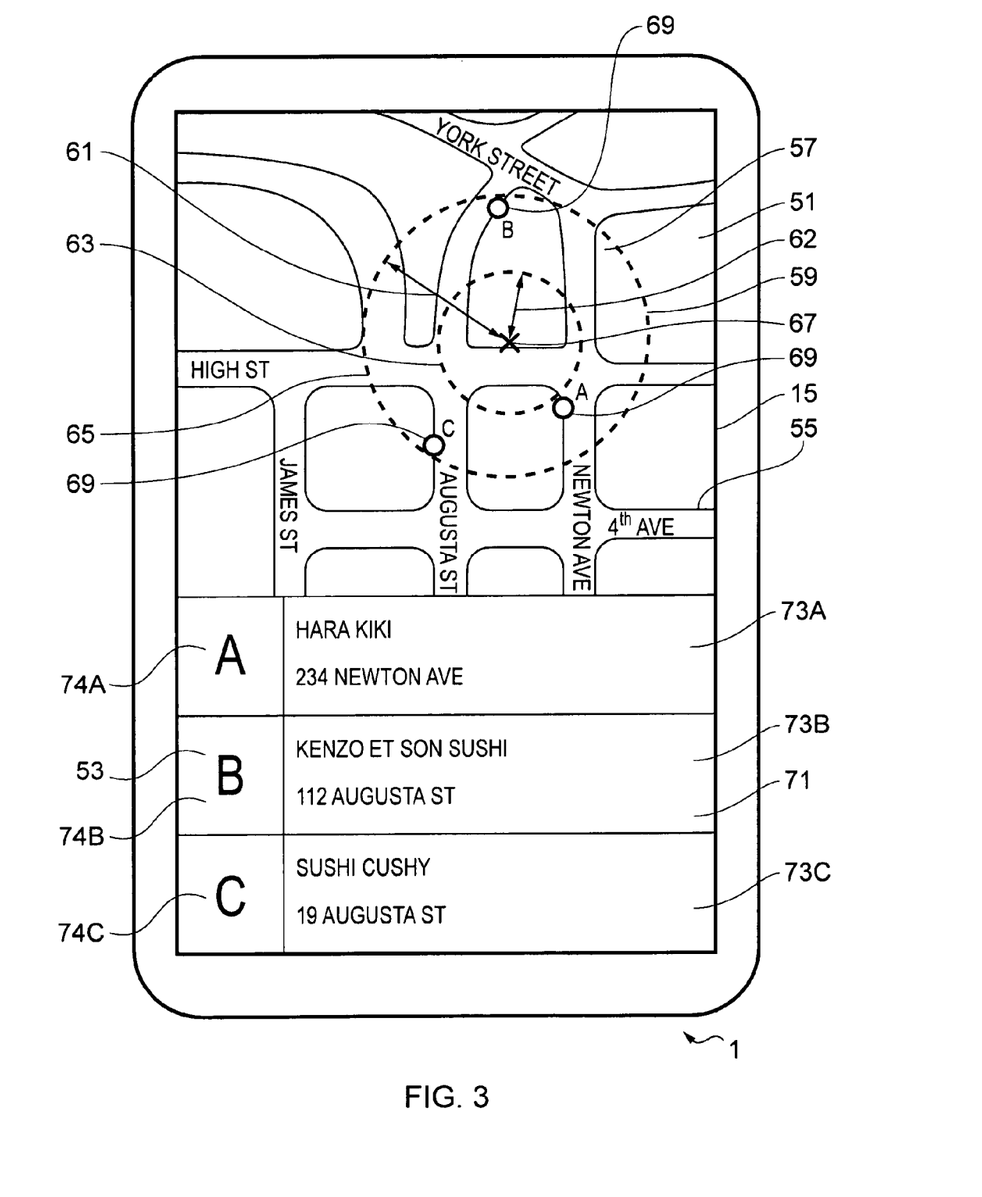
FIG. 3 illustrates a graphical user interface according to an embodiment the present invention.
Figure 4A:
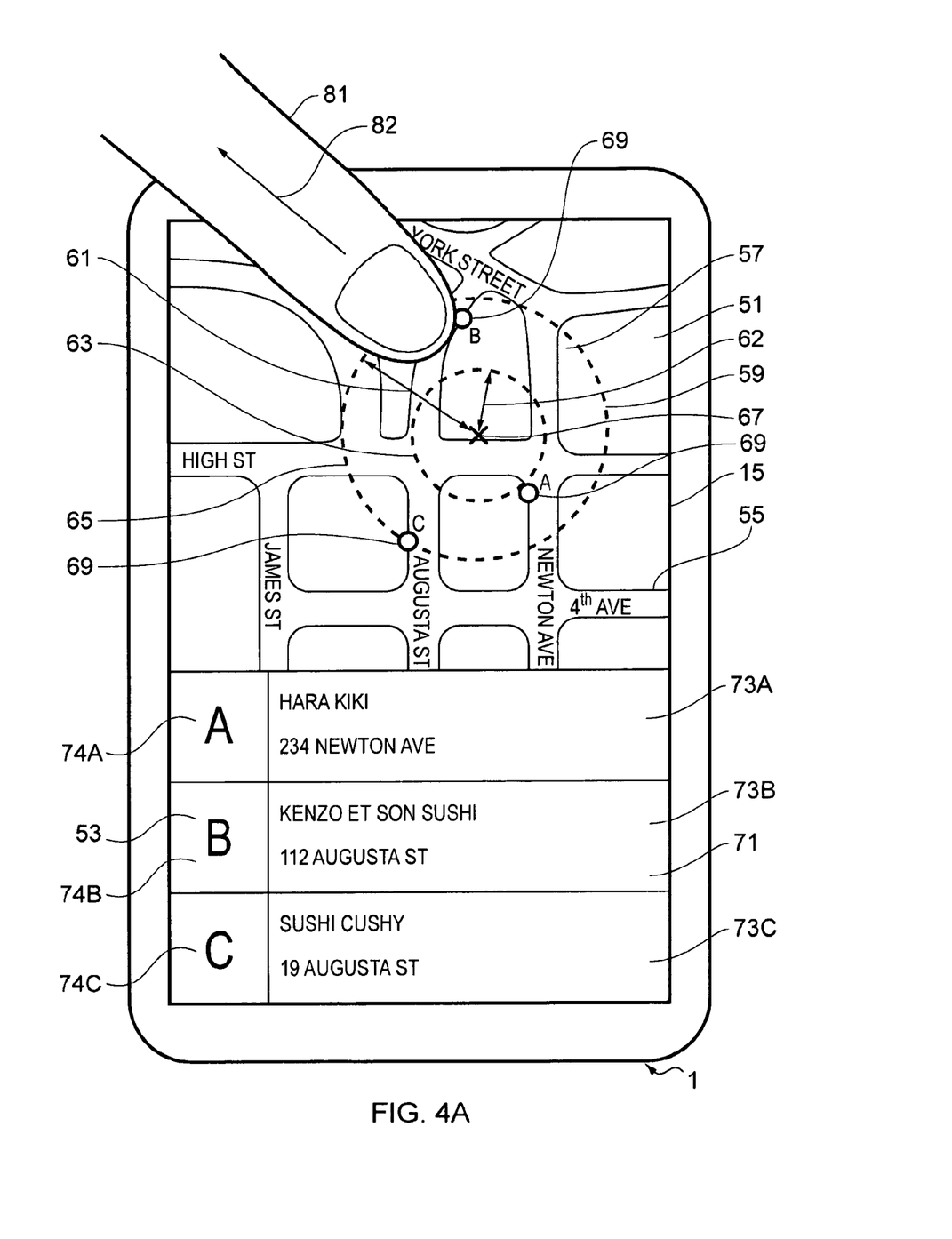
FIGS. 4A and 4B illustrate a first example of the graphical user interface of FIG. 3 in use.
Figure 4B:
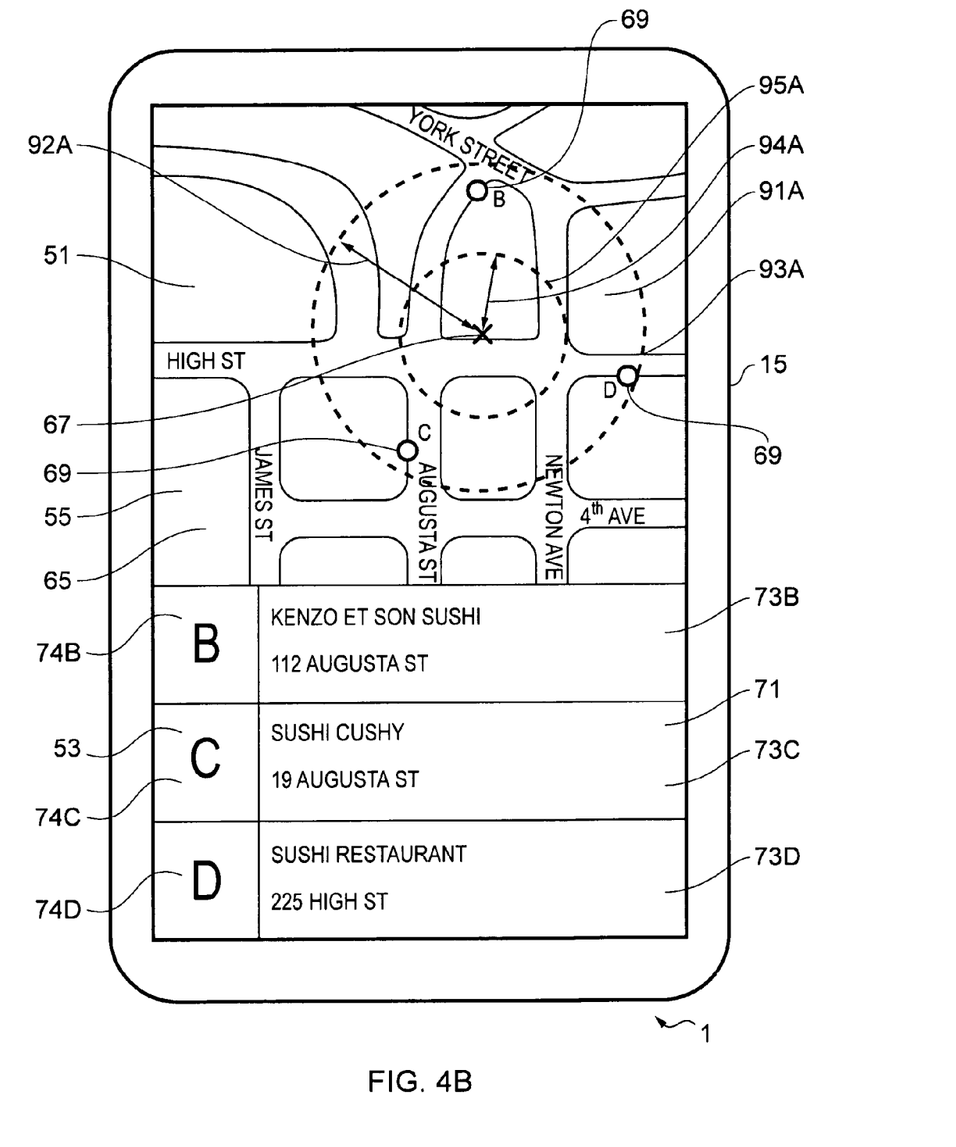
Figure 5A:
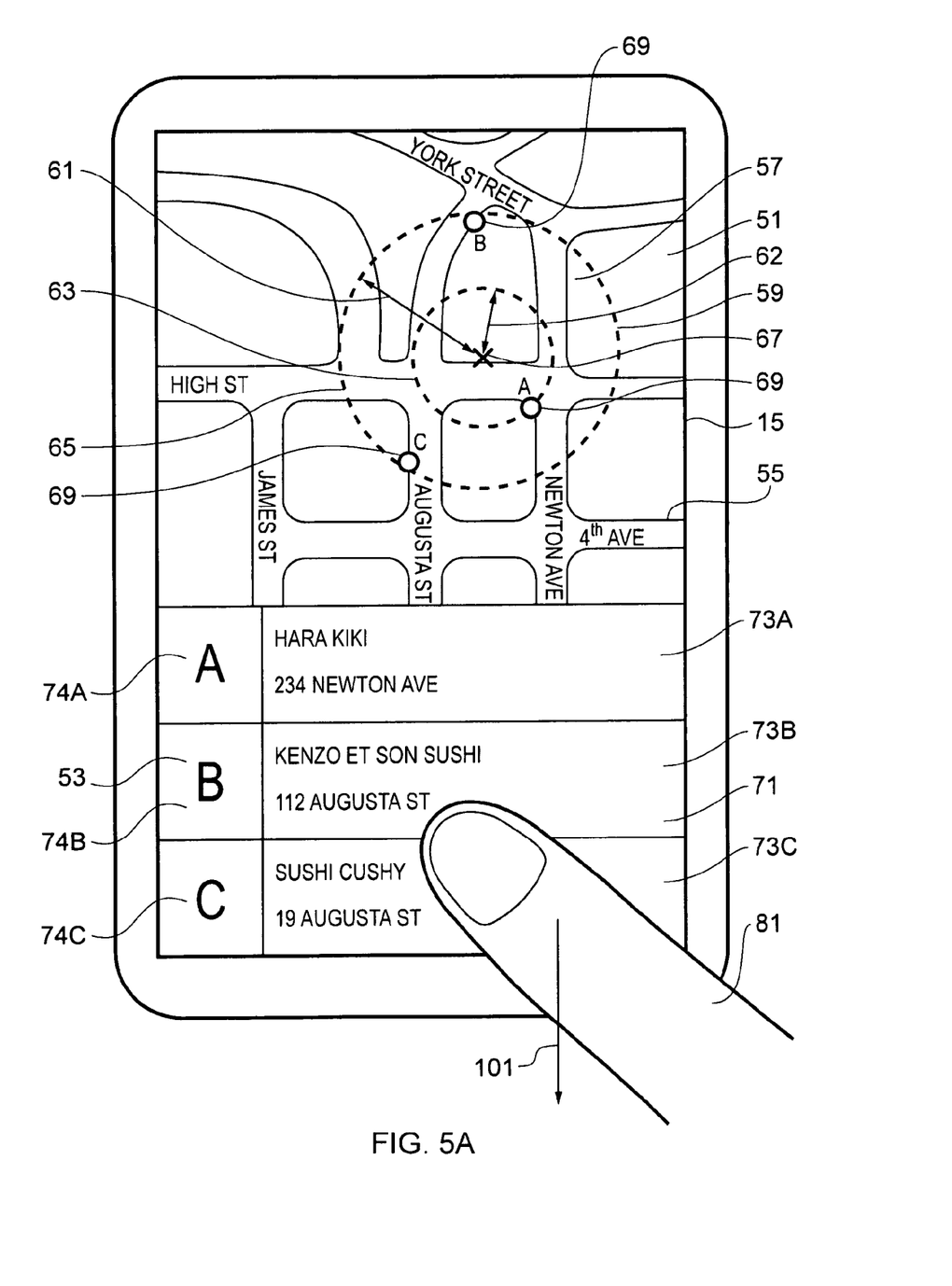
FIGS. 5A and 5B illustrate a second example of the graphical user interface of FIG. 3 in use.
Figure 5B:
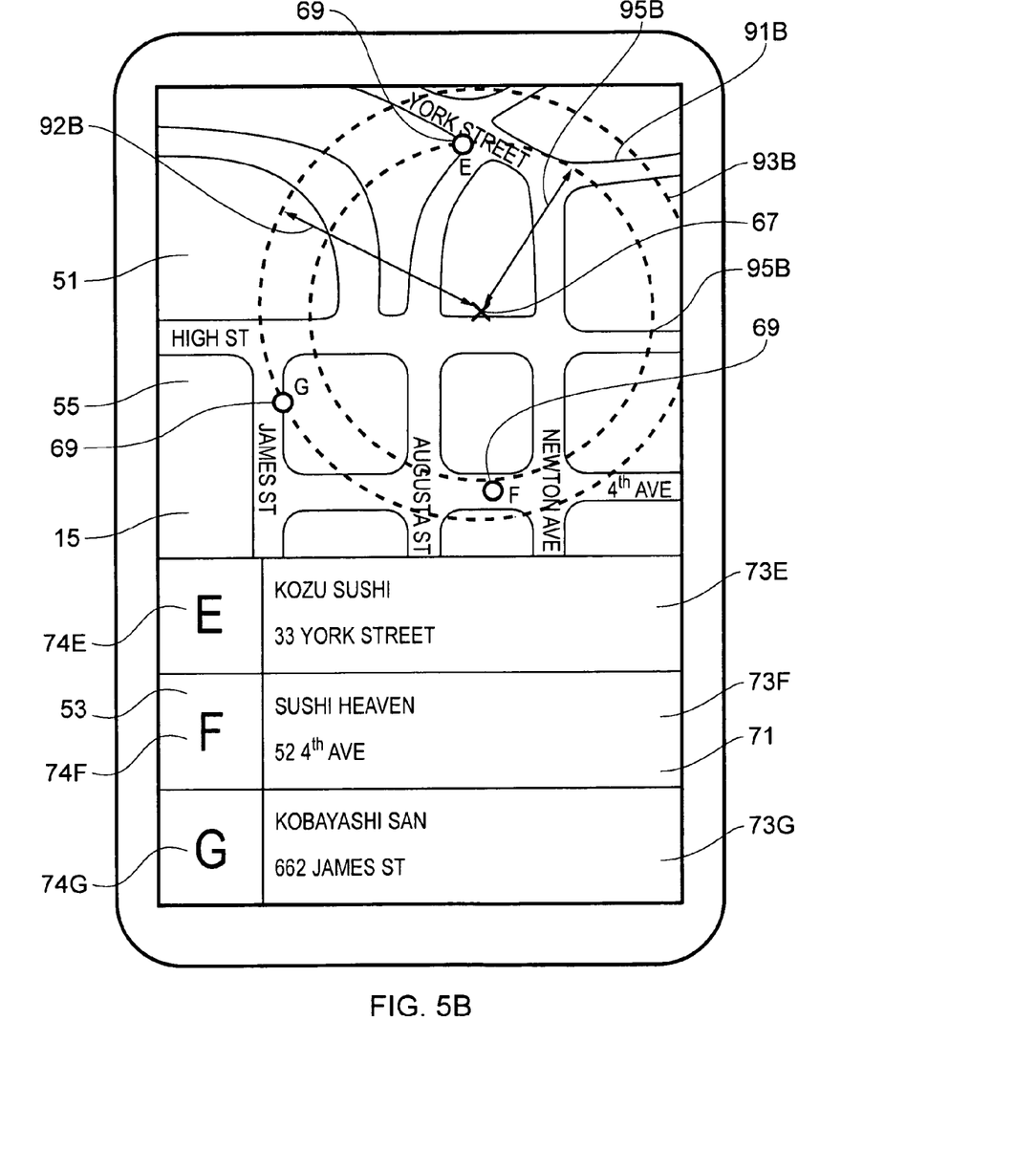

The display 15 is configured to enable information to be presented to a user of the apparatus 1. The information may comprise images, such as maps, text or user selectable options. The display 15 is also configured to present graphical user interfaces 65 to a user. Examples of graphical user interfaces 65 which may be presented on the display 15 are illustrated in FIGS. 3 to 5.

The user input device 17 may comprise a touch sensitive area of the display 15. In such embodiments of the invention the user may actuate the touch sensitive area of the display 15 by physically making contact with the surface of the display 15 with their finger 81 or any other suitable object such as a stylus. In other embodiments the user may be able to actuate the touch sensitive area of the display 15 by bringing their finger 81 or stylus close to the surface of the touch sensitive area of the display 15.

In addition to a touch sensitive area of the display 15 the user input device 17 may also comprise a touch pad, a key pad, a joy stick, or any other user input device which enables a user of the apparatus 1 to input information into the apparatus 1.

The memory 5 stores a computer program 9 comprising computer program instructions 11 that control the operation of the apparatus 1 when loaded into the processor 3. The computer program instructions 11 provide the logic and routines that enables the apparatus 1 to perform the method illustrated in FIG. 2. The processor 3 by reading the memory 5 is able to load and execute the computer program 9.

The computer program instructions 11 may provide computer readable program means for determining locations of interest 69 within a predetermined distance of a first location 67. The computer program instructions 11 may also provide computer readable program means for controlling a display 15 to simultaneously present a map 55, a first bounded area 57 of the map 55 and a list 71 of the determined locations of interest 69 within the first bounded area 57.

The computer program instructions 11 may also provide computer readable program means for detecting a user input and, in response to the detected user input, controlling the display 15 to present a second bounded area 91 of the map 55 and updating the list 71 of the determined locations of interest 69 so that locations of interest 69 within the second bounded area 91 are presented in the list 71.

The computer program 9 may arrive at the apparatus 1 via any suitable delivery mechanism 19. The delivery mechanism 19 may be, for example, a computer-readable storage medium, a computer program product 21, a memory device, a record medium such as a CD-ROM or DVD, an article of manufacture that tangibly embodies the computer program 9. The delivery mechanism may be a signal configured to reliably transfer the computer program 9. The apparatus 1 may propagate or transmit the computer program 9 as a computer data signal.

Although the memory 5 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (e.g. Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 2:
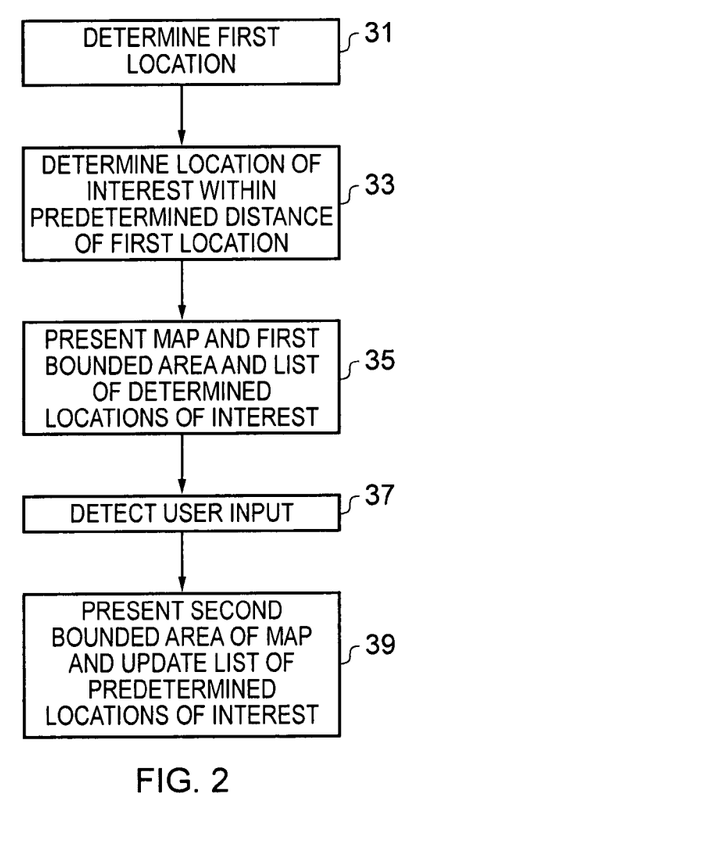
FIG. 2 illustrates a flow chart showing method blocks of an embodiment of the present invention.

A method of controlling the apparatus 1, according to embodiments of the present invention, is illustrated schematically in FIG. 2.

At block 31 a first location 67 is determined. In some embodiments of the invention the first location 67 may be the actual location of the user of the apparatus 1. In such embodiments the first location 67 may be determined by a satellite positioning system. Alternatively, in embodiments of the invention where the apparatus 1 is a mobile cellular telephone the first location 67 may be determined by determining the distance of the apparatus 1 from the cellular base stations.

In some embodiments of the invention the first location 67 may be a location which has been selected by the user. For example the user may wish to select a location 67 which they are intending to visit. In such embodiments the first location 67 may be a postal address which is input into the apparatus 1 using the user input device 17. The postal address may be identified by a code such as a post code or a zip code. The first location 67 may also be selected by selecting a set of geographical coordinates on a map such as selecting degrees of longitude and latitude.

In some embodiments of the invention a user may also be able to select whether they wish to use their actual position as the first location 67 or if they wish to input a particular location to use as the first location 67. For example, the display 15 may present two user selectable options, one which enables a user to input details of a location which will then be used as the first location 67 and one which enables the apparatus 1 to determine the actual location of the user for use as the first location 67.

At block 33 locations of interest 69 within a predetermined distance of the first location 67 are determined.

A location of interest 69 may be any location which may be of use or interest to a user. A location of interest 19 may be associated with something in which the user has indicated that they have an interest or a particular requirement. For example a location of interest 69 may be a business which may provide a product or service which the user would like.

The distance range may be set by a user, for example, they may only wish to be informed about locations of interest 69 within a specific distance. For example, in order to avoid long journeys the user may only wish to obtain information about locations of interest 69 which are within a few hundred meters of the first location 67. In other situations the user of the apparatus 1 may be prepared to travel for a considerable distance to reach a location of interest 69 and so may wish to obtain information about locations of interest 69 which are within several kilometers of the first location 67.

Once the locations of interest 69 have been determined a map 55 and a list 71 of the determined locations of interest 69 are simultaneously presented on the display 15. The determined locations of interest 69 may also be presented on the map.

A first bounded area 57 is presented on the map 55. The list 71 comprises a plurality of items 73. The items 73 correspond to the locations of interest 69 which are located within the first bounded area 57. In some embodiments of the invention only the locations of interest 69 which are within the first bounded area 57 may be presented in the list 71.

At block 37 a user input is detected. In embodiments of the invention where the display 15 comprises a touch sensitive area the user input may be a trace input made in the touch sensitive area. A trace input may be made by a user actuating the touch sensitive area of the display 15 with a finger 81 or a stylus and then moving the finger 81 or stylus across the surface of the display 15. The trace input may be made either in the region of the display 15 where the map 55 is presented or in the region of the display 15 where the list 71 is presented.

In response to the detection of the user input the controller 7 controls the display 15 to present a second bounded area 91A, 91B of the map 55. Also, in response to the detection of the same input, the controller 7 updates the list 71 so that the items 73 of the list 71 presented on the display 15 corresponds to the locations of interest 69 which are located within the second bounded area 91.

The blocks illustrated in FIG. 2 may represent steps in a method and/or sections of code in the computer program 9. The illustration of a particular order to the blocks does not necessarily imply that there is a required or preferred order for the blocks and the order and arrangement of the block may be varied. Furthermore, it may be possible for some steps to be omitted.

FIG. 3 illustrates a graphical user interface 65 according to an embodiment of the present invention. The graphical user interface 65 is presented on the display 15. In the particular embodiment illustrated in FIG. 3 the display 15 is a touch sensitive display. In other embodiments of the invention the display 15 may not be touch sensitive and the apparatus 1 may comprise other user input devices 15.

In the particular embodiment illustrated in FIG. 3 the apparatus 1 is a handheld portable apparatus 1 such as a mobile cellular telephone or a satellite navigation apparatus.

The graphical user interface 65 illustrated in FIG. 3 is presented to a user after the first location 67 has been determined 31 and after the locations of interest 69 have also been determined 33 in accordance with the above described method.

In the particular embodiment illustrated the locations of interest 69 are sushi restaurants. The user may be looking for somewhere to eat and has used the user input device 17 to input that they are interested in sushi restaurants within the vicinity of the first location 67. The controller 4 has then determined the locations of the sushi restaurants within the vicinity of the first location 67 and controlled the display 15 to present information relating to the determined sushi restaurants by presenting the graphical user interface 65 illustrated in FIG. 3.

The graphical user interface 65 comprises a first portion 51 and a second portion 53. The two portions 51, 53 are presented adjacent to each other on the display 15. In the graphical user interface 65 illustrated in FIG. 3 the display 15 is configured in portrait orientation such that the longer side of the display 15 runs vertically and the shorter side runs horizontally. When the apparatus is in the portrait orientation the first portion 51 is presented on the display 15 above the second portion 53. In other embodiments of the invention the second portion 53 may be presented to the side of the first portion 51. For example, when the apparatus 1 is configured in landscape orientation such that the shorter side of the display 15 runs vertically and the longer side runs horizontally the two portions 51, 53 may be presented side by side.

A map 55 is presented in the first portion 51. The map 55 comprises the region around the first location 67. The first location 67 is indicated on the map 55 by a cross. A user may be able to use the touch sensitive display 15 or another user input device 17 to scroll around the map 55 to view a portion of the map 55 which is not presently presented on the display 15. A user may also be able to change the scale of the map 55 for example to zoom in or zoom out of the region of the map 55 presented on the display 15.

As mentioned above the first location 67 may be the actual location of the user which may be determined using a satellite positioning system or by using a cellular communications network. Alternatively it may be a location which has been selected by a user by inputting an address or a set of geographical coordinates into the apparatus 1.

A first bounded area 57 is presented on the map 55. In the embodiment illustrated the first bounded area 57 has an annular shape. The first bounded area 57 has an outer perimeter 59 which is a circle with the first location 67 at the centre of the circle and a radius 61 of a first distance $d_1$. The first bounded area 57 also has an inner perimeter 63 which is also a circle with the first location 67 at the centre of the circle and has a radius 62 of a second distance $d_2$. The distance $d_1$ is larger than the distance $d_2$. The radii 61 and 62 are illustrated in FIG. 3 but need not be presented on the actual user interface 65.

In the illustrated embodiments the perimeter 59, 63 of the bounded area 57 is indicated by dashed lines so that the bounded area 57 is clearly presented to the user. In alternative embodiments of the invention the perimeter 59, 63 may be presented as a solid line. The solid line may be a different color or a different thickness to any of the other lines of the map 55 so that it can be clearly distinguished from the other lines on the map 55.

Other means of indicating the bounded area 57 may be used instead of or in addition to the dashed line perimeter 59, 63. For example the bounded area 57 may be shaded or highlighted so that the area of the map 55 within the bounded area 57 may be presented in different colors to the rest of the map 55.

In other embodiments of the invention the first bounded area 57 may be a different shape. For example, the bounded area 57 may be a circle or a square or rectangle. In some embodiments if the invention the bounded area 57 may have an irregular shape.

The locations of interest 69 within the bounded area 57 are indicated on the map 55. That is, the locations of interest 69 which have a radial distance of less than or equal to $d_1$ but more than or equal to $d_2$ are presented on the display 15. The locations of interest 69 are indicated as small circles. The circles may be colored so that they are prominently presented on the map 55.

In the illustrated embodiment only the locations of interest 69 within the first bounded area 57 are presented on the display 15. This may be useful in a handheld apparatus 1 where the display 15 may be small because it reduces the amount of information which has to be presented on the display 15. In other embodiments of the invention all of the locations of interest 69 within the region of the map 55 presented in the first portion 51 may be presented on the display 15 at the same time. In such embodiments of the invention the locations of interest 69 within the first bounded area 57 may be presented in a different manner to the locations of interest 69 outside the first bounded area 57, for example, they may be presented as different colored dots.

In the graphical user interface 65 illustrated in FIG. 3 the first bounded area 57 has a particular size and shape so that it covers the three locations of interest 69 which are closest to the first location 67. The radius 62 of the inner perimeter 63 corresponds to the distance from the first location 67 to the location of interest 69 closest to the first location and the radius 61 of the outer perimeter 59 correspond to the distance from the first location 67 to the location of interest 69 which is the third closest location of interest 69 to the first location 67.

A list 71 of the determined locations of interest 69 is presented in the second portion 53 of the graphical user interface 65. In the particular embodiment illustrated only the locations of interest 69 within the first bounded area 57 are presented in the list 71. Limiting the list 71 so that only information relating to locations of interest 69 which are within the first bounded area 57 is presented on the display 15 provides the advantage that it reduces the amount of information which is presented to a user at once. This enables the user to clearly see the information relating to the locations of interest 69 and also the relative positions of the locations of interest 69 with respect to the first location 67.

The list comprises a plurality of items 73A, 73B and 73C. Each item in the list has a label 74A, 74B, 74C presented adjacent to it. In this particular embodiment the label 74A, 74B, 74C is a letter. Other labels may be used, for example numbers or the name of the location of interest 69. The labels 74A, 74B, 74C may be presented on the map 55 adjacent to the corresponding location of interest 69 so that a user can clearly associate the points on the map 55 with the items 73A, 73B and 73C in the list 71.

The items 73A, 73B and 73C in the list 71 comprise information relating to the locations of interest 69 such as the name and the address of the location of interest 69. Other information may also be presented in addition to or instead of the address. For example, different contact information may be presented such as a telephone number or an email address. Details about the location of interest 69, such as a customer rating or further information about the services and facilities available at the location of interest 69 may also be provided.

The items 73 may be presented in the list 71 in a particular order. In the illustrated embodiment the items 73 are presented in the list 71 in order of radial distance of the corresponding location of interest 69 from the first location 67. The item 73A with the shortest radial distance is presented at the top of the list 71. In other embodiments the items may be order in terms of a customer assigned rating. A user may be able to select the criteria that are used to order the items 73 in the list 71.

In some embodiments of the invention the apparatus 1 may be configured to enable a user to access functions of the apparatus 1 by actuating the area of the touch sensitive display 15 in which the items 73 of the list 71 are displayed. For example, in embodiments of the invention where the apparatus 1 is a mobile cellular telephone actuating the area of the display 15 where an item 73 is displayed will initiate a communications function and may enable the user to make a telephone call to the location of interest 69 corresponding to the selected item 73. Alternatively, in embodiments of the invention where the apparatus 1 is a satellite navigation apparatus, actuating the area of the display 15 where an item 73 is displayed will initiate a navigations function and enable a set of directions to the location of interest 69 corresponding to the selected item 73 to be provided to the user.

In some embodiments of the invention the apparatus 1 may be configured to enable a user to access such functions of the apparatus 1 by actuating the area of the touch sensitive display 15 in which the locations of interest 69 are presented on the map 55.

The apparatus 1 may also be configured to enable a user to input personal information relating to the locations of interest 69. For example they may be able to put in their own personal ratings which would then be in included in the information which is presented in the list 71.

The apparatus 1 may be configured so that the list 71 always comprises the same number of items as locations of interest 69 located within the bounded area 57 presented on the map 55. In the illustrated embodiment three items are presented in the list 71 which corresponds to the three locations of interest within the first bounded area 67.

In other embodiments of the invention the first bounded area 57 may have a predetermined shape and dimension and so may cover more than three locations of interest 69 or less than three locations of interest 69. In such embodiments there may be a different number of items 73 presented in the list 71.

FIGS. 4A and 4B illustrate a first example of the graphical user interface 65 of FIG. 3 in use. The graphical user interface 65 presented on the display 15 in FIG. 4A is the same as the graphical user interface 65 presented on the display 15 in FIG. 3.

In FIG. 4A the user is making a trace input in the first portion 51 of the graphical user interface 65 in the area in which the map 55 is presented. In the example in FIG. 4A the user makes the trace input by actuating the touch sensitive display 15 with their finger 81 and dragging their finger 81 across the surface of the touch sensitive display 15. In the example in FIG. 4A the user starts the trace input in the are of the display 15 in which the first bounded area 57 is presented and drags their finger 81 away from the cross representing first location 67, towards the top left hand corner of the display 15. The general direction of the trace input is indicated by the arrow 82.

In response to the detection of the trace user input the graphical user interface 65 illustrated in FIG. 4B is presented to the user. In this graphical user interface 65 both the map 55 presented in the first portion 51 and the list 71 presented in the second portion 53 have been updated.

The map 55 has been updated by removing the first bounded area 57 and presenting a second bounded area 91A. The second bounded area 91A also has an annular shape similar to the first bounded area 57.

The second bounded area 91A has an outer perimeter 93A which is a circle with the first location 67 at the centre of the circle and a radius 92A of a distance $d_3$. The second bounded area 91A also has an inner perimeter 95A which is also a circle with the first location 67 at the centre of the circle and has a radius 94A of a distance $d_4$. The distance $d_3$ is larger than the distance $d_4$.

As the trace input extended in a direction away from the first location 67 the second bounded area 91A is further away from the first location 67 than the first bounded area 67. That is $d_4$ is greater than $d_2$ and $d_3$ is greater than $d_1$. In the graphical user interface 65 illustrated in FIG. 4B the inner perimeter 95A corresponds to the distance from the first location 67 to the location of interest 69 which has been determined to be the second closest location of interest 69 to the first location 67 and radius 92A of the outer perimeter 93A corresponds to the distance from the first location 67 to the location of interest 69 which has been determined to be the fourth closest location of interest 69 to the first location 67.

The second bounded area 91A is different to the first bounded area 57 because it has different perimeters. Some areas of the first bounded area 57 and the second bounded area 91A may overlap so that a region of the map 55 which was in the first bounded area 57 may also be the second bounded area 91A.

The second bounded area 91A also encompasses three locations of interest 69. Two of these locations of interest 69 were also included in the first bounded area 57. The location of interest 69 located on the outer perimeter 93A was not in the first bounded area 57 and this location of interest 69 is a new piece of information which is presented on the map 55 in response to the trace input.

The location of interest 69 which was located on the inner perimeter 63 of the first bounded area 57 is not located within the second bounded area 91 and is no longer presented on the display 15. This is a piece of information that is removed from the display 15 in response to the trace input.

The second portion 53 of the graphical user interface 65 is also updated in response to the trace input. The list 71 of determined locations of interest is updated so that the items 73 in the list 71 correspond to the locations of interest 69 which are within the second bounded area 91A. The first item 73B on the list 71 corresponds to the location of interest 69 with a radial distance from the first location 67 corresponding to the radius 94A of the inner perimeter 95A of the second bounded area 91A. This item 73B was presented on the list 71 before the trace user input but has been moved up the list in response to the trace user input. The second item 73C in the list 71 was also presented on the list before the trace user input but has also been moved up the list 71 in response to the trace user input. The third item 73D on the list 71 corresponds to the location of interest 69 with a radial distance from the first location 67 corresponding to the radius 92A of the outer perimeter 93A of the second bounded area 91A. This is a new item on the list 71 which was not presented before the trace user input. The item 73A is no longer presented on the list 71 because this item 73A corresponds to a location of interest 69 which is not within the second bounded area 91A.

It is to be appreciated that the trace user input may be repeated any number of times and each time the trace user input is made the bounded area is updated to encompass a new location of interest 69 and the list 71 is updated to include the item 73 corresponding to the new location of interest 69.

The graphical user interface 65 may be updated as the trace input is being made or when the trace input is completed.

In the exemplary use of the invention illustrated in FIGS. 4A and 4B the user drags their finger 81 away from the cross representing the first location 67 and in response to this trace input is presented with information about locations of interest 69 which are located further away from the first location 67. It is to be appreciated that if a trace input was made in the first portion 51 of the display 15 in a direction towards the cross representing the first location 67 then the user would be presented with information about locations of interest 69 closer to the first location 67.

FIGS. 5A and 5B illustrate a second example of the graphical user interface 65 of FIG. 3 in use. The graphical user interface 65 presented on the display 15 in FIG. 5A is the same as the graphical user interface 65 presented on the display 15 in FIG. 3 and FIG. 4A.

In FIG. 5A the user is making a trace input in the second portion 53 of the graphical user interface 65 in the area in which the list 71 is presented. As in the previous example of use the user makes the trace input by actuating the touch sensitive display 15 with their finger 81 and dragging their finger 81 across the surface of the touch sensitive display 15. In the example in FIG. 5A the user starts the trace input in the portion of the display in which the items 73 of the list 71 are presented and drags their finger 81 downwards towards the bottom of the display 15 in the general direction indicated by the arrow 101.

In response to the detection of this user input the graphical user interface 65 illustrated in FIG. 5B is presented to the user. In this graphical user interface 65 both the map 55 presented in the first portion 51 and the list 71 presented in the second portion 53 have been updated similar to the previous example illustrated in FIG. 4B.

The list 71 of determined locations of interest 69 is updated by moving through the list 71 in the direction of the trace input. For example, in FIG. 5A the user is making a trace input in a generally downwards direction. In response to this trace input the list 71 is scrolled downwards so that the items 73E, 73F and 73G presented in the list 71 after the trace input are items 73 which were beneath the items 73A, 73B and 73C in the list 71 presented before the trace input was made. In the particular embodiment illustrated the items 73 in the list 71 are arranged in order of radial distance 67 from the first location 67 so that the items 73E, 73F and 73G presented on the list 71 after the trace input correspond to locations of interest 69 which are further away from the first location 67 than the previously presented items 73A, 73B and 73C.

In other embodiments of the invention the items 73 in the list 71 may be arranged by a different criterion such as a user rating. In such embodiments the items 73 presented on the list 71 after the trace input will correspond to locations of interest 69 with a lower user rating. These locations of interest may be further away from or closer to the first location 67.

It is to be appreciated that if a user made a trace user input in the second portion 53 of the display 15 in an upwards direction then this would scroll upwards through the list 71 so that the items 73 presented in the list after the trace user input would correspond to locations of interest 69 which are closer to the first location 67 than the previously presented items 73.

In the graphical user interface 65 illustrated in FIG. 5B the user has scrolled far enough through the list 71 so that none of the items 73A, 73B and 73C presented in the list 71 in FIG. 5A are also presented in the list 71 after the trace input has been made. The user may scroll this far down the list 71 by making a plurality of small trace inputs or by making a single large trace input. The graphical user interface 65 may be updated as the trace input is being made or may only be updated once the trace input has been completed.

In the illustrated example, the number of items 73 of the list 71 presented on the display 15 does not change in response to the trace input. In the illustrated example there are always three items 73 presented in the list 71.

The first portion 51 of the graphical user interface 65 is also updated in response to the trace input made in the second portion 53. The map 55 which is presented in the first area 51 has been updated by removing the first bounded area 57 and presenting a second bounded area 91B. The second bounded area 91B also has an annular shape similar to the first bounded area 57.

The second bounded area 91B has an outer perimeter 93B which is a circle with the first location 67B at the centre of the circle and a radius 92B of a distance $d_5$. The second bounded area 91B also has an inner perimeter 95B which is also a circle with the first location 67 at the centre of the circle and has a radius 94B of a distance $d_6$. The distance $d_5$ is larger than the distance $d_6$.

The second bounded area 91B covers the area of the map 55 in which the locations of interest 69 corresponding to the items 73 in the updated list 71 are presented. As the trace input scrolled through the list 71 so that the items 73E, 73F and 73G presented in updated list 71 correspond to locations of interest 69 which are further away from the first location 67 than the items 73A, 73B and 73C originally presented on the list 71 the second bounded area 91B is further away from the first location 67 than the first bounded area 67. That is, $d_5$ is larger than $d_1$ and $d_6$ is larger than $d_2$.

In the exemplary embodiment in FIGS. 5A and 5B the inner perimeter 95B corresponds to the distance from the first location 67 to the location of interest 69 which corresponds to the item 73E which is now presented at the top of the list 71. The radius 61 of the outer perimeter 93 corresponds to the distance from the first location 67 to the location of interest 69 which corresponds to the item 73G which is now presented at the bottom of the list 71.

The second bounded area 91B is different to the first bounded area 57 because it has different perimeters. In the particular embodiment illustrated in FIGS. 5A and 5B there is no overlap between the first bounded area 57 and the second bounded area 91B because none of the items 73 presented in the list 71 after the trace input correspond to locations of interest 69 which are located in both the first bounded area 57 and the second bounded area 91B.

The map 55 is also updated so that the locations of interest 69 corresponding to the currently presented items 73E, 73F and 73G in the list 71 are now presented in the graphical user interface 65. This is new information which is presented in response to the trace user input. The locations of interest 69 corresponding to the items 73A, 73B and 73C which are no longer presented in the list 71 have been removed from the graphical user interface 65.

Embodiments of the above described invention provide the advantage that information relating to locations of interest 69 can be clearly and concisely presented to a user of an apparatus 1. This is particularly advantageous where the apparatus 1 is a small apparatus 1 such as a handheld apparatus 1 and the space available for a display 15 and user input device 17 is limited.

Embodiments of the invention enable a user to update both a map 55 and a list 71 of determined locations of interest 69 in response to a single user input. This provides a user interface 65 which is simple for a user to use because a single user input can enable the update of two separate portions of the graphical user interface 65. Also by synchronizing the list 71 and the map 55 in this manner a user can easily locate the items 73 of the list in the map 55 and also easily find information relating to locations of interest 69 within a particular area of the map 55.

Although embodiments of the present invention have been described in the preceding paragraphs with reference to various examples, it should be appreciated that modifications to the examples given can be made without departing from the scope of the invention as claimed. For example In the above described embodiments of the invention the user input is a trace user input made on a touch sensitive display 15. In other embodiments of the invention the user input may be a different type of input, for example, actuation of a key in a key pad or actuation of a joystick or roller key.

In the embodiment described in relation to FIGS. 4A and 4B, when a user makes a trace input in the first portion 51 of the graphical user interface 65 the second bounded area 91A is configured so that the outer perimeter 93A corresponds to the radial distance of a location of interest 69 from the first location 67. In other embodiments of the invention the outer perimeter 93A of the second bounded area 91A may correspond to the location on the display 15 where the trace input ended.

In some embodiments of the invention the scale of the map 55 may also be changed in response to the trace user input. For example where the next location of interest 69 is located in a region which is not presented in the originally presented map 55 then the scale of the map 55 maybe decreased so that a larger geographical region may be displayed in the map 55. In such embodiments of the invention the size of the bounded areas as they are presented on the display 15 may be adjusted to allow for the change in scale of the map 55.

In the above described embodiments the entire of the bounded area is always presented on the display. In other embodiments of the invention only a portion of the bounded area may be presented on the display. For example a user may be able to zoom in on a particular region of the map 55 so that they can view the region in more detail, in which case only a portion of the bounded area may be presented on the display 15.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
   processing circuitry and memory circuitry including computer program code, the memory circuitry and the computer program code configured to, with the processing circuitry, cause the apparatus at least to perform:
   determining locations of interest within a predetermined distance of a first location;
   controlling a display to simultaneously present a map, a first bounded area of the map, and a list of the determined locations of interest within the first bounded area, wherein the map is presented in a first portion of the display and the list is presented in a second portion of the display and both the first and second portions of the display are configured to enable user inputs;

receiving an indication of a user input via a user input device; and in response to receiving the indication of the user input, controlling the display to present a second bounded area of the map and update the list of the determined locations of interest so that locations of interest within the second bounded area are presented in the list.

2. An apparatus as claimed in claim 1 wherein the bounded area has a defined perimeter.

3. An apparatus as claimed in claim 2 wherein at least a portion of the perimeter is presented on the display.

4. An apparatus as claimed in claim 1 wherein the determined locations of interest which are presented in the list are the locations of interest which satisfy a first criterion with respect to the bounded area.

5. An apparatus as claimed in claim 4 wherein the first criterion is that the locations of interest are within the bounded area and are within a determined distance of the perimeter of the bounded area.

6. An apparatus as claimed in claim 1 wherein the first location is the location of the user.

7. An apparatus as claimed in claim 1 wherein the first location is a location selected by the user.

8. An apparatus as claimed in claim 1 wherein the locations of interest are presented on the map.

9. An apparatus as claimed in claim 1 wherein the user input is a trace user input in at least one of the region of the display in which the map is presented or the region of the display in which the list of the determined locations of interest is presented.

10. An apparatus as claimed in claim 1 wherein in response to the user input the scale of the map is changed.

11. A method comprising:

determining, with a processor, locations of interest within a predetermined distance of a first location;

controlling a display to simultaneously present a map, a first bounded area of the map, and a list of the determined locations of interest within the first bounded area, wherein the map is presented in a first portion of the display and the list is presented in a second portion of the display and both the first and second portions of the display are configured to enable user inputs;

receiving an indication of a user input; and in response to receiving the indication of the user input, controlling the display to present a second bounded area of the map and updating the list of the determined locations of interest so that locations of interest within the second bounded area are presented in the list.

12. A method as claimed in claim 11 wherein the bounded area has a defined perimeter and at least a portion of the perimeter is presented on the display.

13. A method as claimed in claim 11 wherein the determined locations of interest which are presented in the list are the locations of interest which satisfy a first criterion with respect to the bounded area.

14. A method as claimed in claim 13 wherein the first criterion is that the locations of interest are within the bounded area and are within a determined distance of the perimeter of the bounded area.

15. A method as claimed in claim 11 wherein the first location is the location of the user.

16. A method as claimed in claim 11 wherein the first location is a location selected by the user.

17. A method as claimed in claim 11 further comprising presenting the locations of interest on the map.

18. A method as claimed in claim 11 wherein the user input is a trace user input in at least one of the region of the display in which the map is presented or the region of the display in which the list of the determined locations of interest is presented.

19. A method as claimed in claim 11 wherein in response to the user input the scale of the map is changed.

20. A computer program product comprising at least one non-transitory computer-readable storage medium having computer-executable program code instructions stored therein, the computer-executable program code instructions comprising program code instructions to:

determine locations of interest within a predetermined distance of a first location enable;

control a display to simultaneously present a map, a first bounded area of the map, and a list of the determined locations of interest within the first bounded area, wherein the map is presented in a first portion of the display and the list is presented in a second portion of the display, and both the first and second portions of the display are configured to enable user inputs;

receiving an indication of a user input; and in response to receiving the indication of the user input, control the display to present a second bounded area of the map and update the list of the determined locations of interest so that locations of interest within the second bounded area are presented in the list.

* * * * *

UNITED STATES PATENT AND TRADEMARK OFFICE
CERTIFICATE OF CORRECTION

| | | |
|---|---|---|
| PATENT NO. | : 8,700,303 B2 | Page 1 of 1 |
| APPLICATION NO. | : 13/130483 | |
| DATED | : April 15, 2014 | |
| INVENTOR(S) | : Uusitalo | |

It is certified that error appears in the above-identified patent and that said Letters Patent is hereby corrected as shown below:

In the claims:

<u>Column 14,</u>
Line 32, "first location enable;" should read --first location;--.

Signed and Sealed this
Fifteenth Day of July, 2014

Michelle K. Lee
*Deputy Director of the United States Patent and Trademark Office*

UNITED STATES PATENT AND TRADEMARK OFFICE
CERTIFICATE OF CORRECTION

PATENT NO.        : 8,700,303 B2
APPLICATION NO.   : 13/130483
DATED             : April 15, 2014
INVENTOR(S)       : Jussi Severi Uusitalo It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 256 days.

Signed and Sealed this

Twenty-ninth Day of September, 2015

Michelle K. Lee
*Director of the United States Patent and Trademark Office*